US006442647B1

(12) United States Patent
Morton et al.

(10) Patent No.: US 6,442,647 B1
(45) Date of Patent: Aug. 27, 2002

(54) METHOD AND APPARATUS FOR UTILIZATION OF PLURAL COMMANDS TO IMPROVE READ RESPONSE TIMES OF DATA FROM A DISK TRACK

(75) Inventors: Robert Louis Morton, Tucson, AZ (US); John Richard Paveza, Morgan Hill, CA (US); Emily Theresa White; Shu-Ling Cathy Win, both of San Jose, CA (US)

(73) Assignee: International Business Machines Corporation, Armonk ( * ) Notice: Subject to any disclaimer, the term of this patent is extended or adjusted under 35 U.S.C. 154(b) by 0 days.

(21) Appl. No.: 09/138,813

(22) Filed: Aug. 21, 1998

(51) Int. Cl.[7] .............................. G06F 12/00; G06F 3/00
(52) U.S. Cl. ........................................ 711/112; 711/113
(58) Field of Search .................................. 711/113, 137, 711/112, 4, 111

(56) References Cited

U.S. PATENT DOCUMENTS

| 4,423,479 A | | 12/1983 | Hanson et al. ............... 711/113 |
| 4,603,380 A | * | 7/1986 | Easton et al. ................ 711/113 |
| 4,800,483 A | | 1/1989 | Yamamoto et al. .......... 710/126 |
| 5,121,479 A | | 6/1992 | O'Brien ........................ 710/34 |
| 5,261,072 A | | 11/1993 | Siegel .......................... 710/22 |
| 5,353,426 A | | 10/1994 | Patel et al. ................... 711/118 |
| 5,535,372 A | * | 7/1996 | Benhase et al. ............. 711/100 |
| 5,566,317 A | | 10/1996 | Treiber et al. ............... 711/117 |
| 5,584,040 A | * | 12/1996 | Curt et al. ..................... 710/52 |
| 5,664,144 A | * | 9/1997 | Yanai et al. .................. 711/113 |
| 5,689,729 A | | 11/1997 | Inoue ............................ 710/52 |
| 5,742,789 A | | 4/1998 | Ofer et al. .................... 711/111 |

* cited by examiner

Primary Examiner—Do Hyun Yoo
Assistant Examiner—Yamir Encarnacion
(74) Attorney, Agent, or Firm—Ohlandt, Greeley, Ruggiero & Perle, LLP; Abdy Raissinnia, Esq.

(57) ABSTRACT

The invention enables reduction of latency time for receipt of data which has been requested from a disk system. The method enables use of a read command which enables a cache memory output to occur only when the read command has been completed. The method of the invention initially receives a read request from a host processor for a number of data blocks on a disk track (referred to as requested blocks), the requested blocks being a subset of blocks stored in the disk track. If the requested blocks are not already stored in a cache memory, the method constructs at least a first command to transfer the track to cache memory, the first command enabling identification of a last data block of the requested blocks. A second command is also prepared to transfer the track to cache memory, the second command enabling identification of the last block of the remaining set of blocks in the track. Thereafter, the first command is executed and when the last block of the requested blocks has been transferred to cache memory, indicating completion of the first command, transfer of the requested blocks from cache memory to the host processor is commenced. The second command is also executed and enables a staging of the remaining blocks of the disk track to cache memory, thereby assuring that the entire track resides in cache memory.

12 Claims, 2 Drawing Sheets

METHOD AND APPARATUS FOR UTILIZATION OF PLURAL COMMANDS TO IMPROVE READ RESPONSE TIMES OF DATA FROM A DISK TRACK

FIELD OF THE INVENTION

This invention relates to staging of data into a cache memory from a disk track in response to a host processor read command and, more particularly, to a method and apparatus for enabling a read-out of requested blocks of data from the cache memory prior to completion of the staging of an entire track of data from the disk track.

BACKGROUND OF THE ART

Modern disk subsystems provide mass storage facilities for plural host processors. Storage controllers associated with such disk subsystems enable a staging of data from disk tracks into a cache memory, either in response to a read request or, in anticipation of a read request. Early cache memory management systems did not enable a read-out of track data being stored therein, until the entire track had been transferred from disk. This was so even though the requested data might have been positioned at the beginning of the track and been resident in cache memory for a period of time, awaiting completion of the track transfer.

More recent cache memory controllers have enabled concurrent input and output operations from the cache memory. In particular, they enable transfer of data in the cache memory to the requestor while further track data is still being written into the cache memory. Examples of such prior art systems appear in the patents described below.

U.S. Pat. No. 5,121,479 to O'Brien describes a system for coordinating reading and writing of data files into and out of a data buffer so that a data file can be written into the data buffer while another data file is concurrently being read out of the data buffer. U.S. Pat. No. 5,689,729 to Inoue describes a storage subsystem which provides plural access paths to a cache memory from a host processor and a plurality of independent access paths between the cache memory and a disk memory. Means are described which allow substantially independent operation of the host-to-cache paths and the cache-to-disk paths.

U.S. Pat. No. 4,800,483 to Yamamoto et al. describes a system which enables data transfer operations to be executed in parallel, between a disk unit and disk cache unit, and between the disk cache unit and a main storage memory.

In summary, each of the aforesaid patents allows overlapping input and output of data to/from a cache memory to reduce latency time that is incurred during such data transfers.

A subset of the prior art enables a readout of a data record from cache memory, even before the entire data record has been received into the cache memory. For instance, U.S. Pat. No. , 5,742,789 to Ofer et al. describes a system for retrieving a data file from a disk drive and provides for overlapping read operations, thereby reducing latency seen by a requesting host computer. Upon receiving a request for retrieval of data, a channel director places the request in a data cache. If a cache miss occurs, a disk director reads and transfers the data file from the disk drive to the data cache. At a certain point in the transfer of the data file into the data cache, the disk director places a start read message in the data cache which is then read by the channel director. Upon receipt of the start read message, the channel director begins to read the data file from the data cache, thus reading data from the data cache as the disk director completes writing the data file to the data cache.

U.S. Pat. No. 5,353,426 to Patel et al. applies the above technique of Ofer et al. to the obtaining of instructions for a currently running program on a processor. More specifically, Patel et al. provide a cache miss buffer which is adapted to satisfy read requests to a portion of a cache fill that is still in progress, without waiting for the cache fill to complete. Patel et al. try to avoid an instruction/data fetch fault which would cause a central processing unit to become idle while awaiting the receipt of the instruction/data. More specifically, the system of Patel et al. determines if the address requested to be accessed is part of a memory block frame within a current cache fill and, if yes, control logic enables a transfer thereof out of cache, even though the cache fill is not yet complete.

In accordance with the above prior art teachings, a read command which requires a staging of a subset of data from a track into cache memory, upon sensing a last data block of a requested set of data blocks being written into cache memory, will signal a cache memory output control mechanism to commence outputting the data to the requesting host processor.

In many instances, it is desirable to read the entire disk track into cache memory so that if a succeeding set of data blocks from the track is requested next, or if an update command for data in the track is received, that the track is already present in the cache memory. Accordingly, many read commands require that the entire track be staged into cache memory and, upon sensing the completion of the track staging operation, then enable a cache memory controller to access the requested data. More specifically, the command is set up in such a manner that a data access can occur only when the requested data transfer is complete (in many cases being the entire track).

Accordingly, it is an object of this invention to provide an improved method and apparatus for reducing latency time experienced in response to a disk track read request.

SUMMARY OF THE INVENTION

The invention enables reduction of latency time for receipt of data which has been requested from a disk system. The method enables use of a read command which enables a cache memory output to occur only when the read command has been completed. The method of the invention initially receives a read request from a host processor for a number of data blocks on a disk track (referred to as requested blocks), the requested blocks being a subset of blocks stored in the disk track. If the requested blocks are not already stored in a cache memory, the method constructs at least a first command to transfer the track to cache memory, the first command enabling identification of a last data block of the requested blocks. A second command is also prepared to transfer the track to cache memory, the second command enabling identification of the last. block of the remaining set of blocks in the track. Thereafter, the first command is executed and when the last block of the requested blocks has been transferred to cache memory, indicating completion of the first command, transfer of the requested blocks from cache memory to the host processor is commenced. The second command is also executed and enables a staging of the remaining blocks of the disk track to cache memory, thereby assuring that the entire track resides in cache memory.

DETAILED DESCRIPTION OF THE INVENTION

Hereafter, the invention will be described in the context of a disk memory subsystem that is adapted to service a plurality of host processors via SCSI buses. Within the disk memory subsystem, communications occur over PCI buses whose data transmission speeds are more closely matched to processor speeds in the disk memory subsystem. The term "cache hit" means that data requested to be read is already present in a cache memory and an access to a connected disk drive to satisfy the read request is not required. A "cache miss" means that requested data has been found to be absent from the cache memory and that a disk track read is required to retrieve the requested data.

Figure 1:
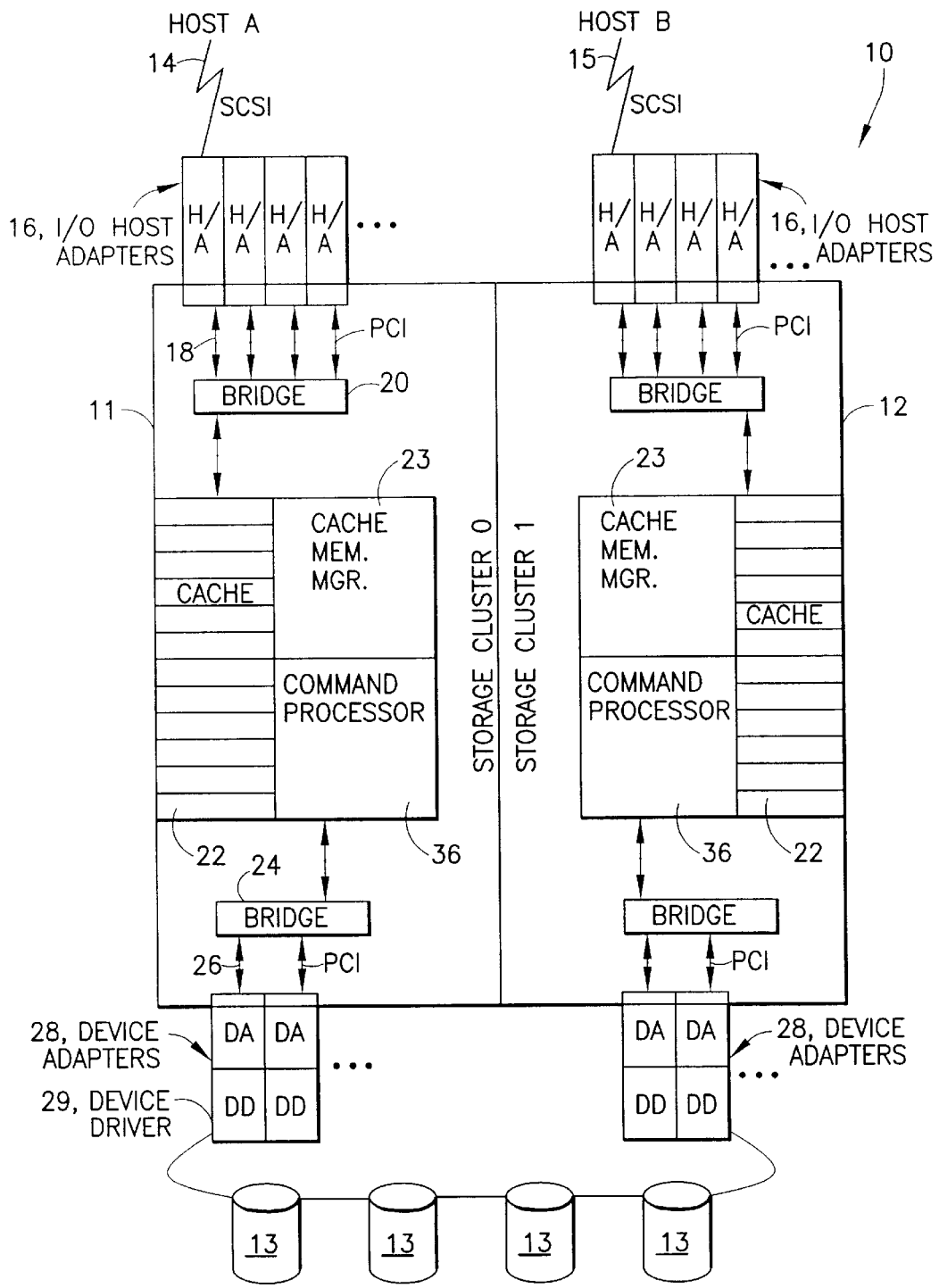
FIG. 1 is a high level block diagram of a system adapted to carry out the invention.

Referring to FIG. 1, disk memory subsystem 10 includes a plurality of storage cluster modules 11 and 12, etc. that enable a plurality of host processors to read and write data to/from a plurality of connected disk drives 13. Disk memory subsystem 10 is coupled to a host processors (e.g., A and B) via SCSI buses, e.g., 14 and 15. While only two host processors are shown, disk memory subsystem 10 is adapted to couple to many such host processors and to provide mass storage facilities therefor. Further, other buses using different interface protocols (e.g., ESCON) to host processors may also be used.

Each SCSI bus is received into an I/O host adapter, e.g. 16, which is a data processor for handling input/output actions between a host processor and disk memory subsystem 10. Each I/O host adapter 16 converts the format of received data to that which can be placed on a PCI bus 18 and, via a PCI bridge 20, written to a cache memory 22. The operation of each cache memory is overseen by a cache memory manager 23. Each cache memory 22 is further coupled via an additional PCI bridge 24 and PCI bus 26, to an I/O device adapter 28. Each I/O device adapter 28 is a processor which utilizes a device driver 29 to handle input/output actions between disk memory subsystem 10 and a plurality of disk drives 13.

A command processor 36 is associated with each cache memory manager 23, receives read requests via a coupled PCI bus from an I/O host adapter 16; and translates the received read request to a format that is able to be handled by disk memory subsystem 10. As will be hereafter understood, it is generally desirable to respond to a read request by reading an entire track of data from a disk memory 13 into cache memory 22. However, the read commands that are utilized by I/O host adapter 16 require that the read action be completed before a signal is generated enabling a next action to occur. More precisely, a read command must have completed, that is, the data specified by the read command to be accessed must have been completely transferred to cache memory 22 before the next action can occur. That action, of course, is the read-out of the data from cache memory 22 via I/O host adapter 16 to the requesting host processor.

Accordingly, if the command that is established by command processor 36 specifies an entire track to be accessed in order to obtain one or more blocks of data from within the track, the read-out from cache memory 22 must await the completion of the transfer of the entire track.

The invention makes use of the established read command structure by dividing a host processor's read action into two commands. Assuming for the sake of example, that the requested blocks of data reside in an initial portion of a track, the first command specifies a read action of all data blocks in the track up to and including a last block of the requested blocks to be provided to the host processor. The command specifies the first data block and a count of subsequent data blocks to be retrieved from the disk track. The second command is a read command and specifies the same track, but starts at the block following the last block of the first command and the count extends to the last block of the track.

Thus, when the first command is executed, and the last block specified by the first command is found to be present in cache memory 22, I/O device adapter 28 is enabled to issue a "complete" signal which enables I/O host adapter 16 to commence a transfer of the requested data blocks that are present in cache memory 22. Concurrently, the second command is executed, enabling the remaining blocks of a track to be stored into cache memory 22.

Figure 2:
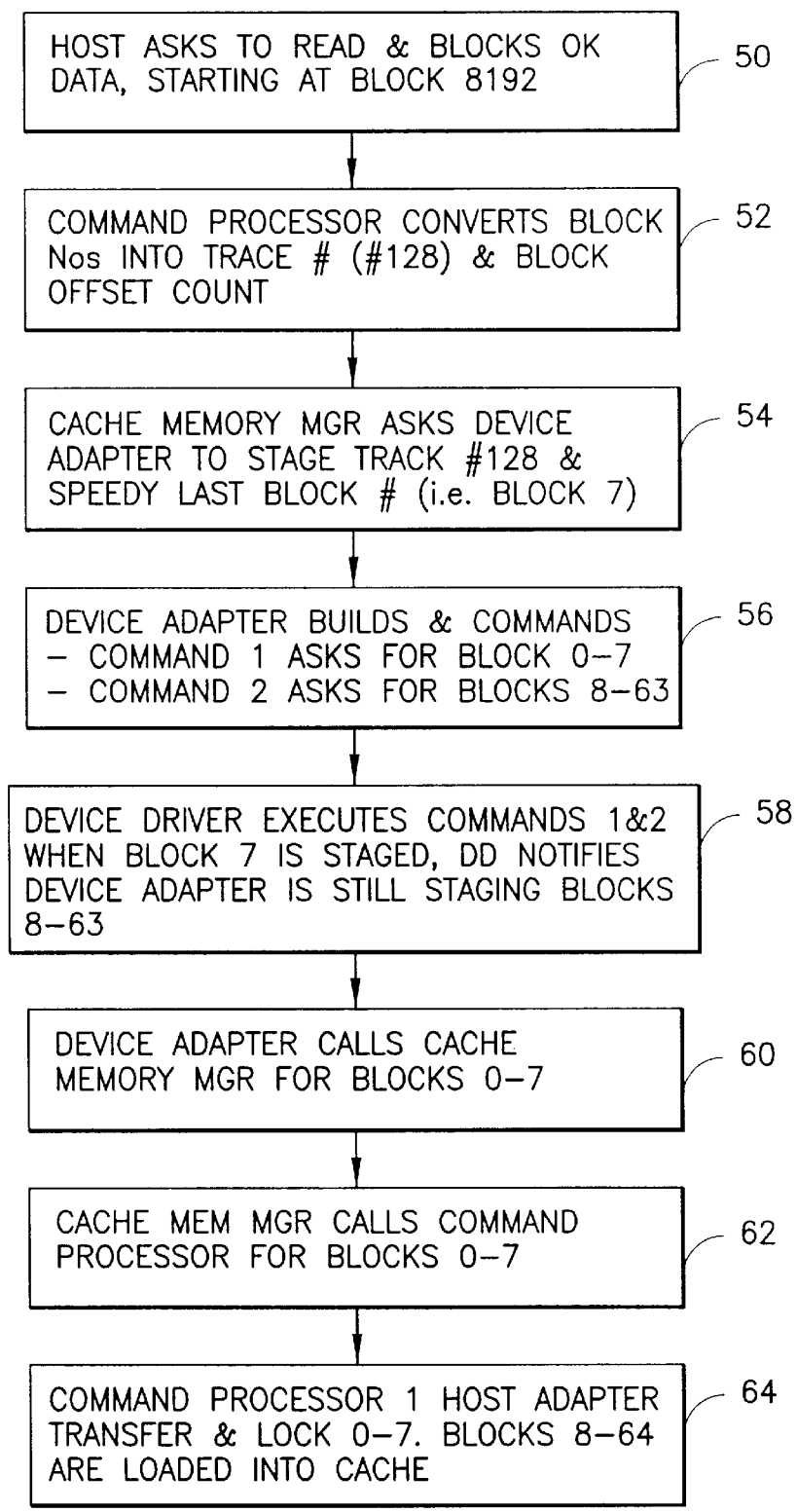
FIG. 2 is a logical flow diagram illustrating the method of the invention.

Turning now to FIG. 2, the procedure of the invention will be further described in regards to a specific example. Initially, assume that a host processor requests a read of eight blocks of data starting at block 8192 (step 50). That request means that blocks 8192–8199 must be sent to the requesting host processor. Upon receiving that read request, command processor 36 converts the block numbers into a track number (e.g. track number 128) and defines block offsets within track 128. In this instance, assume that the eight blocks are blocks 0–7 in track 128.

Command processor 36 passes the read request to cache memory manager 23. Thereafter, cache memory manager 23 requests I/O device adapter 28 to stage track 128, and specifies block 7 as the last block to be staged, assuming that a search of cache memory 22 has resulted in a cache miss (step 54).

I/O device adapter 28 then builds two commands to submit to device driver 29. A first command is a read request for blocks 0–7 from track.128 and the second command is a read request for blocks 8–63, assuming 64 blocks in a track (step 56).

Thereafter, device driver 29 accesses a disk drive 13 containing track 128 and commences execution of the first command. This action causes the data from track 128, including blocks 0–7, to be written to cache memory 22. Concurrently, an I/O device adapter 28 commences execution of the second command to access data blocks 8–63 from track 128.

When device driver 29 finishes staging data into cache memory 22 for the first command, I/O device adapter 28 is notified and it, in turn, indicates to cache memory manager 23 the completion of the storage therein of data blocks 0–7 from track 128. This notification is evidence of completion of the first command and generally occurs prior to the completion of the stage operation which is currently ongoing for blocks 8–63 (step 58). (It may not occur first if the read action of the disk track starts somewhere in blocks 1–8, in which case the read of tracks 8–63 will complete first. However, the chances of this happening for this example is $8/64$ or $1/8$)

Thereafter, cache memory manager 23 calls command processor 36 and provides a notification that blocks 0–7 are ready for transfer. Meanwhile, the execution of the second command continues. Then, command processor 36 notifies I/O host adapter 16 that the data to be transferred is ready and I/O host adapter 16 undertakes to transfer the data from cache memory 22 to the requesting host processor (step 64).

As can thus be seen, the invention enables existing command structures to be employed; enables dispatch of data from cache memory 22 to the requesting host processor prior to the completion of staging of the entire track; and still enables the entire track to be staged. Further, the invention allows operations with fixed size data blocks to coexist in a same storage subsystem with Count/Key/Data operations and associated caching algorithms.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for improving latency time for data transfers from a disk memory subsystem, said method comprising the steps of:
   a) receiving a read request from a host processor for at least one data block stored within a disk track (hereafter called "requested data blocks"), said requested data blocks being a subset of data blocks stored in said disk track;
   b) if said requested data blocks are not already stored in a cache memory, dividing said read request into at least (i) a first command to transfer said requested data blocks, including a last data block of said requested data blocks, from said disk track to said cache memory, and (ii) a second command to transfer from said disk track to cache memory, all data blocks in said disk track that follow said requested data blocks starting at a data block following said last block of said requested data and extending to a last data block of said track;
   c) executing said first command and when said requested data blocks have been transferred to said cache memory, indicating completion of said first command and commencing transfer of said requested blocks to said host processor from said cache memory; and
   d) executing said second command to enable storage in said cache memory of said all data blocks in said disk track that follow said requested data blocks starting at the data block following said last data block of said requested data and extending to the last data block of said track, wherein said first command and said second command transfer said disk track in its entirety to said cache memory.

2. The method as recited in claim 1, wherein said first command enables a last data block of said requested data blocks to be identified, and said a second command enables a last block to be identified of a remaining set of data blocks in said disk track that follow said requested data blocks.

3. The method as recited in claim 2, wherein step c causes issuance of a completion signal when a last block is determined to be resident in said cache memory.

4. A system for improving latency time for data transfers from a disk memory subsystem to a host processor, said system comprising:
   a cache memory;
   a plurality of disk drives;
   host adapter means for receiving a read request from a host processor for a plurality of blocks of data stored within a disk track in one of said disk drives (hereafter called "requested data blocks"), said requested data blocks being a subset of data blocks stored in said disk track;
   device adapter means responsive to a control action from said host adapter means in response to said read request, for dividing said read request into at least (i) a first command to transfer said requested data blocks, including a last data block of said requested data blocks, from said disk track to said cache memory, and (ii) a second command to transfer from said disk track to cache memory, all data blocks in said disk track that follow said requested data blocks starting at a data block following said last data block of said requested data and extending to a last data block of said track, and executing said first command and when said requested data blocks have been transferred to said cache memory, indicating completion of said first command, and executing said second command to enable storage in said cache memory of all said data blocks in said disk track that follow said requested data blocks starting at the data block following said last data block of said requested data and extending to the last data block of said track, wherein said first command and said second command transfer to said cache memory said disk track in its entirety; and
   wherein said host adapter is responsive to said completion indication of said first command to commence transfer of said requested blocks to said host processor from said cache memory.

5. The system as recited in claim 4, wherein said first command enables said device adapter means to identify a last data block of said requested data blocks and said a second command enables said device adapter means to identify a last block of a remaining set of data blocks in said disk track that follow said requested data blocks.

6. The system as recited in claim 5, wherein each said command specifies an initial data block and a count of additional data blocks to be read.

7. The system as recited in claim 4, wherein said read request is received by said host adapter means in a count/key/data format, said host adapter means further comprising:
   cache manager means including a command processor, said command processor for converting said count/key/data format request into a read command that identifies fixed data blocks holding data that corresponds to data identified by said count/key/data format request.

8. The system as recited in claim 7, wherein said said command processor further converts data blocks written into said cache memory from a disk drive into said count/key/data format for transmittal to said host processor.

9. A system for improving latency time for data transfers from a disk memory subsystem to a host processor, said disk memory subsystem requiring that an entire disk track be accessed in order to obtain at least one data block from within said disk track, said system comprising:
   a cache memory;
   a plurality of disk drives;
   a host adapter for receiving a read request from a host processor for a plurality of data blocks (i) through (j) stored within said disk track in one of said disk drives (hereafter called "requested data blocks"), said requested data blocks (i) through (j) being a subset of data blocks stored in said disk track; and
   a device adapter responsive to a control action from said host adapter in response to said read request, for dividing said read request into at least (a) a first command that transfers said requested data blocks (i) through (j) from said disk track to said cache memory, and (b) a second command that transfers from said disk track to said cache memory data blocks (j+1) through a last data block (n) of said track wherein said first command and said second command transfer said disk track in its entirety to said cache memory, executing said first command, indicating completion of said first command when said requested data blocks (i) through (j) have been transferred to said cache memory wherein said host adapter in response commences transfer of said requested data blocks from said cache memory to said host processor, and said device adapter executes said second command to enable storage of said data blocks (j+1) through (n) in said cache memory.

10. The system as recited in claim 9, wherein each said command specifies an initial data block and a count of additional data blocks to be read.

11. The system as recited in claim 9, wherein said read request is received by said host adapter means in a count/key/data format, said host adapter means further comprising:
   a cache manager comprising a command processor, said command processor for converting said count/key/data format request into a read command that identifies fixed data blocks holding data that corresponds to data identified by said count/key/data format request.

12. The system as recited in claim 11, wherein said command processor further converts data blocks written into said cache memory from a disk drive into said count/key/data format for transmittal to said host processor.

* * * * *